United States Patent [19]

Heald et al.

[11] E Patent Number: Re. 31,677

[45] Reissued Date of Patent: Sep. 18, 1984

[54] PROCESS FOR RECOVERY OF CARBONACEOUS MATERIALS FROM SUBTERRANEAN DEPOSITS

[75] Inventors: David D. Heald, Daly City; John C. McKinnell, Bakersfield; Mitchell A. Lekas, Concord, all of Calif.

[73] Assignee: Geokinetics, Inc., Concord, Calif.

[21] Appl. No.: 398,381

[22] Filed: Jul. 14, 1982

Related U.S. Patent Documents

Reissue of:

[64] Patent No.: 3,980,339
Issued: Sep. 14, 1976
Appl. No.: 568,900
Filed: Apr. 17, 1975

U.S. Applications:

[63] Continuation of Ser. No. 939,420, Sep. 5, 1978, abandoned.

[51] Int. Cl.[3] ..... E21B 43/247; E21C 41/10

[52] U.S. Cl. ..... 299/2; 166/259; 299/4; 299/13

[58] Field of Search ..... 166/247, 256, 299; 299/2, 3, 4, 13

[56] References Cited

U.S. PATENT DOCUMENTS

| | | | |
|---|---|---|---|
| 2,630,307 | 3/1953 | Martin | 166/259 UX |
| 2,761,663 | 9/1956 | Gerdetz | 299/2 |
| 3,620,301 | 11/1971 | Nichols | 166/247 X |
| 3,630,283 | 12/1971 | Knutson et al. | 166/247 X |
| 3,661,423 | 5/1972 | Garrett | 299/2 |
| 3,877,373 | 4/1975 | Bergmann et al. | 299/13 X |
| 3,902,422 | 9/1975 | Coursen | 299/13 X |
| 4,266,612 | 5/1981 | French | 166/299 |

*Primary Examiner*—George A. Suchfield
*Attorney, Agent, or Firm*—Brown & Martin

[57] ABSTRACT

Subterranean mineral deposits, such as oil shale or the like, are prepared for in situ retorting by selectively mining out an area at the base of the deposit leaving an overlying deposit supported in a suitable manner such as by a plurality of pillars. The overlying deposit is expanded in any suitable manner into the underlying area in a fashion to create a predetermined distribution of permeability from an area of low permeability to an area of high permeability. An inlet is provided at the low permeability area and an outlet at the high permeability area. A suitable medium is introduced into the deposit at the low permeability end for extracting and forcing mineral values from the deposit toward the outlet end for recovery.

30 Claims, 10 Drawing Figures

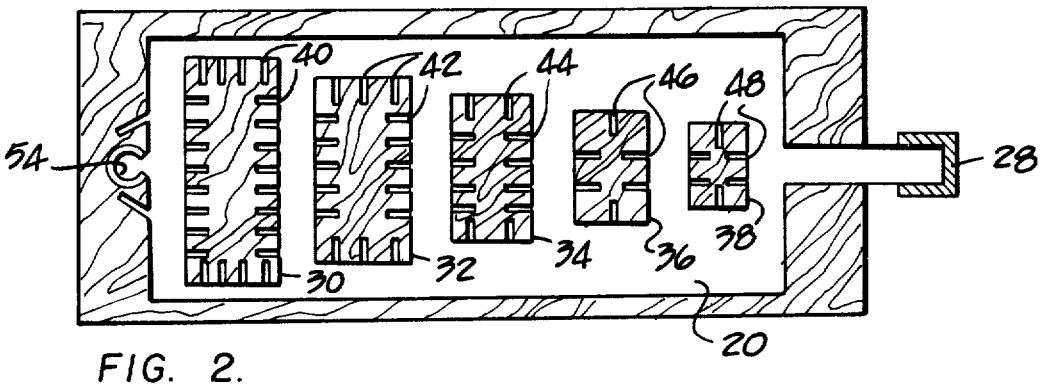
FIG. 2.
FIG. 1.
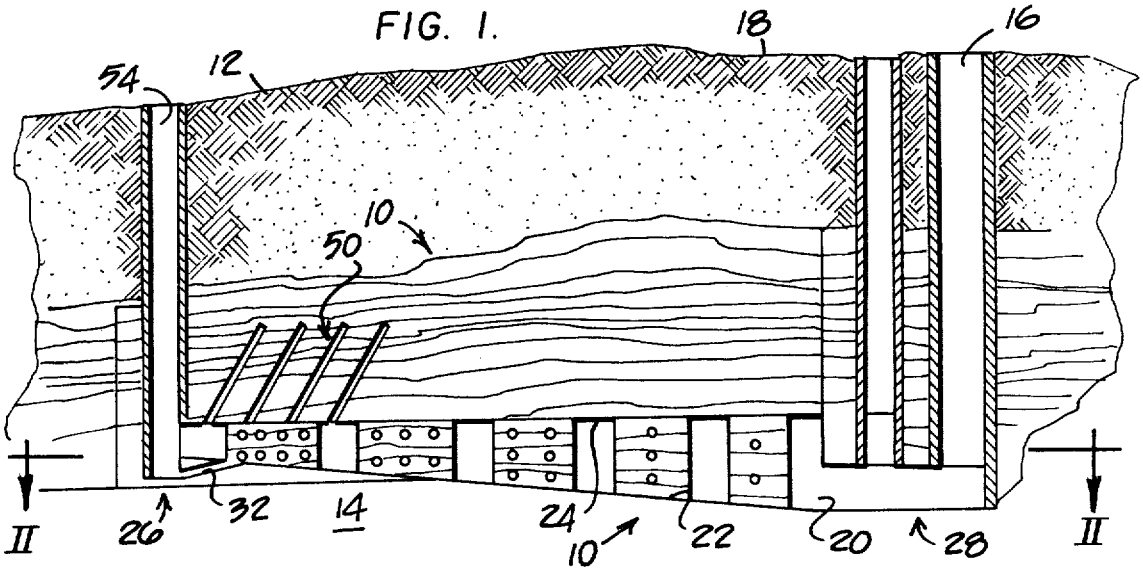
FIG. 3.
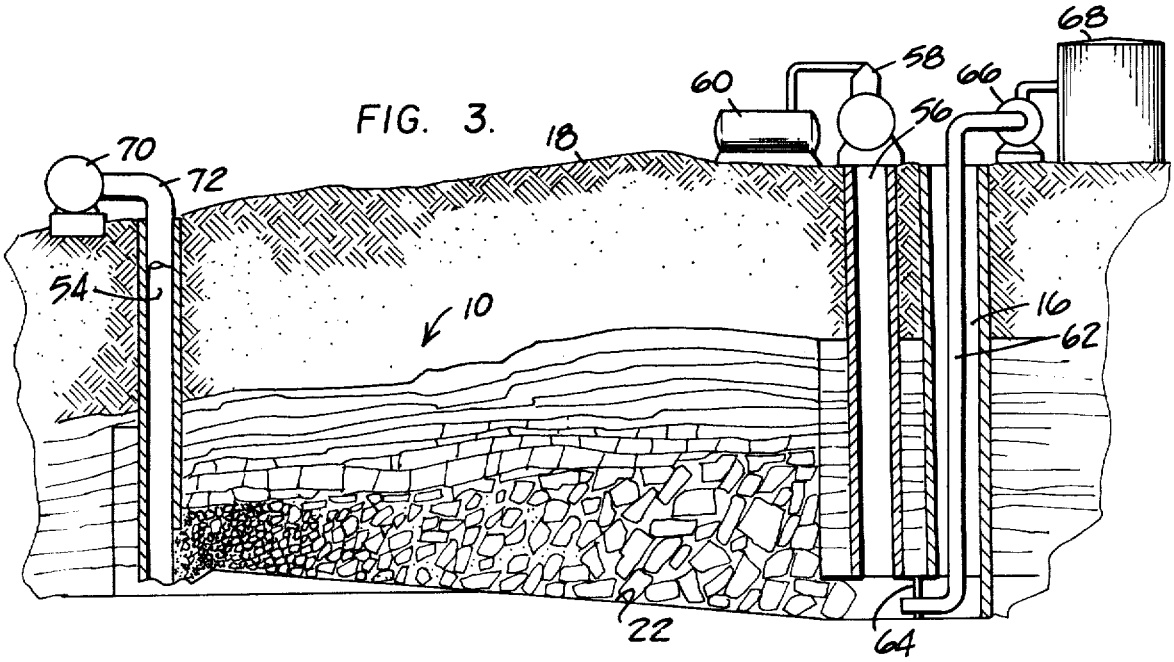

FIG. 4.
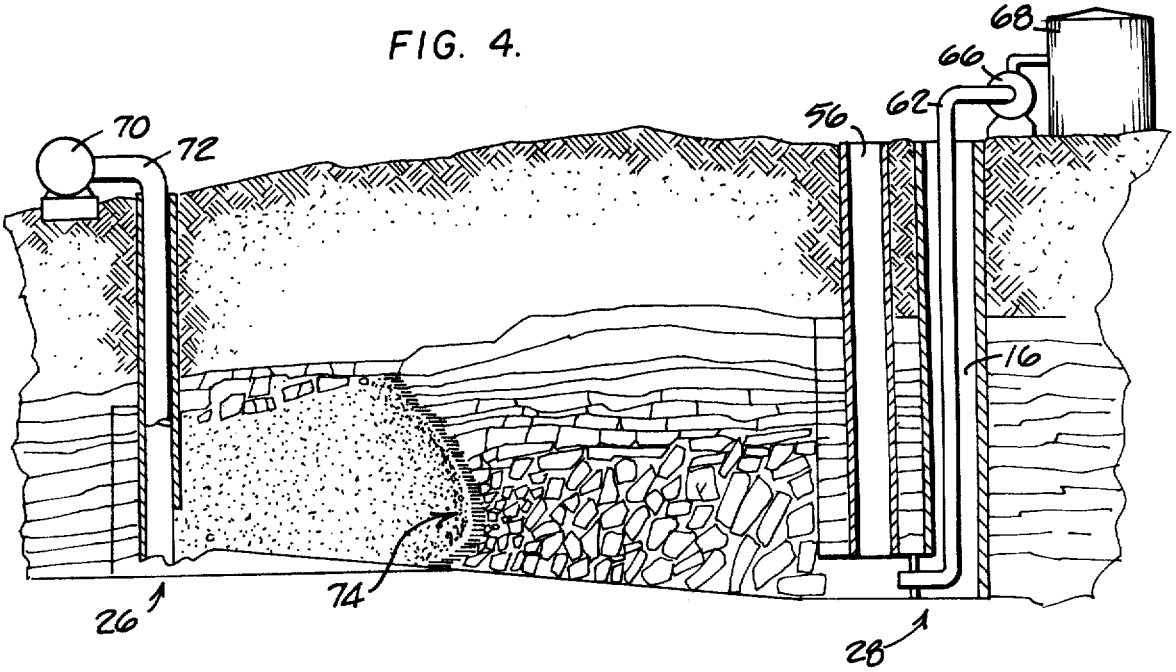
FIG. 5.
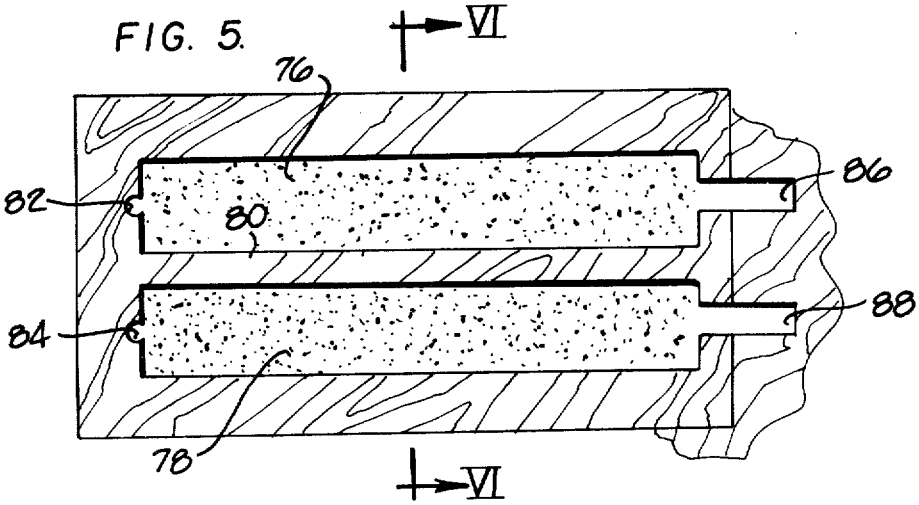
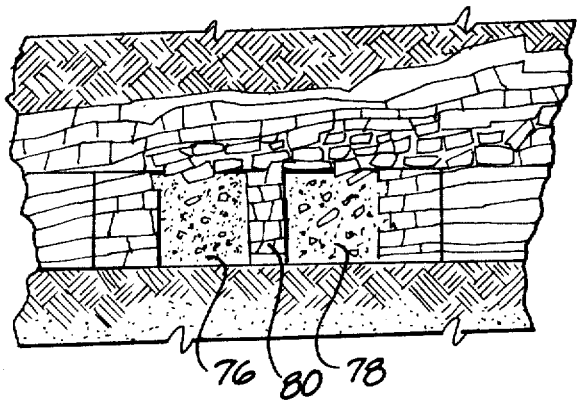
FIG. 6.

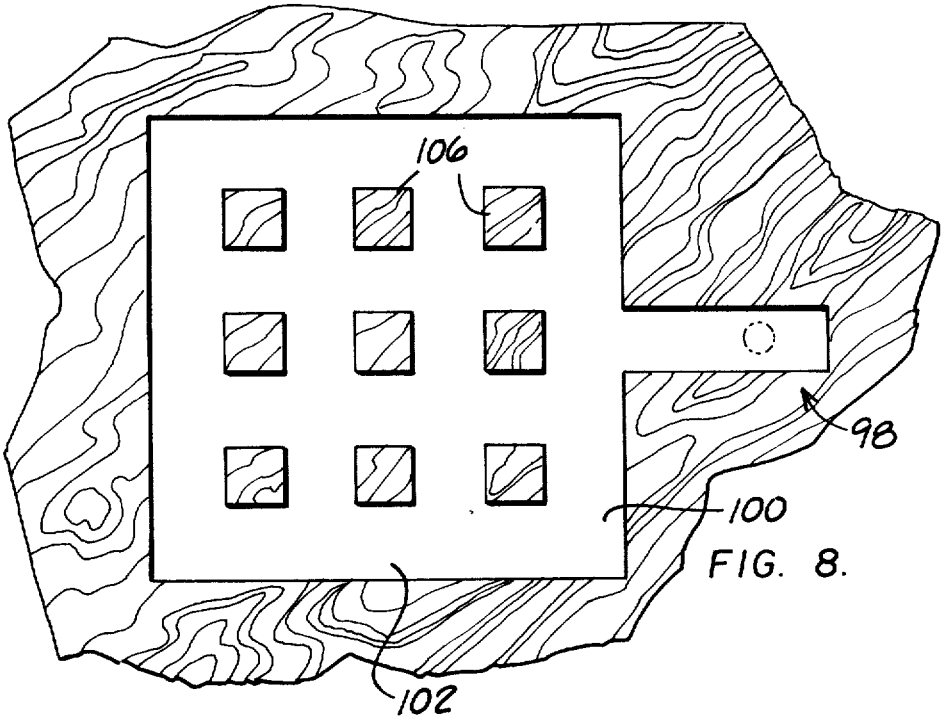
FIG. 8.
FIG. 7.
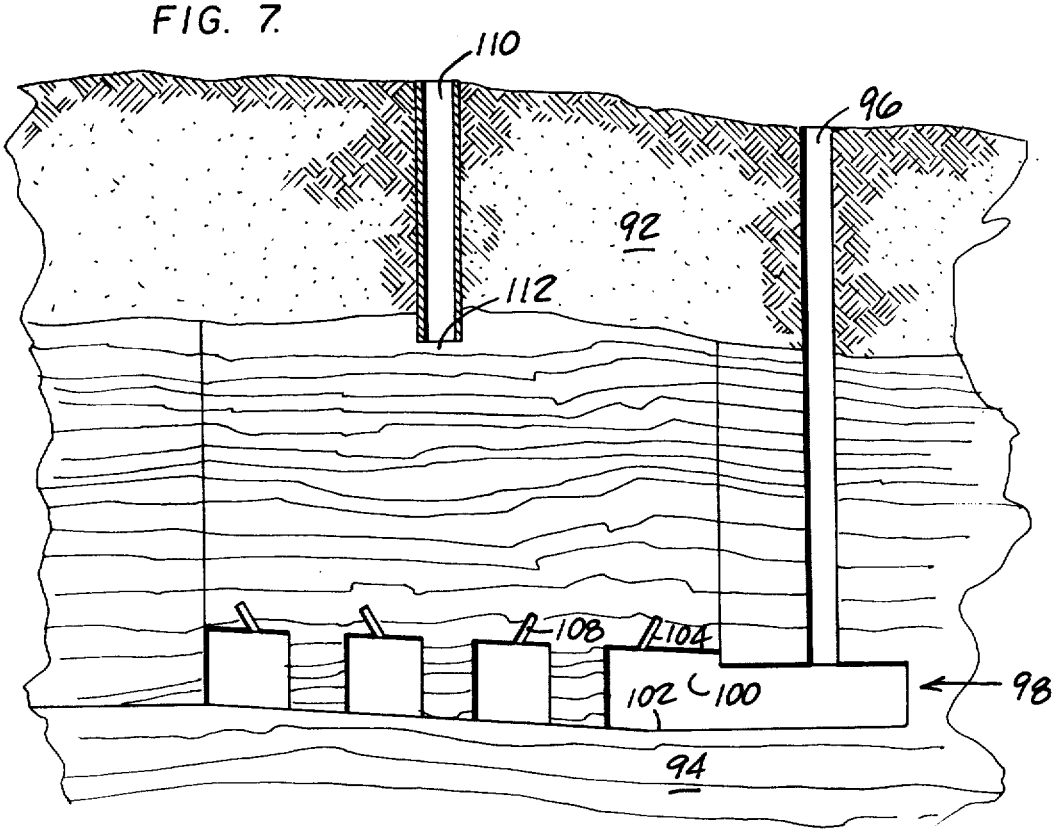

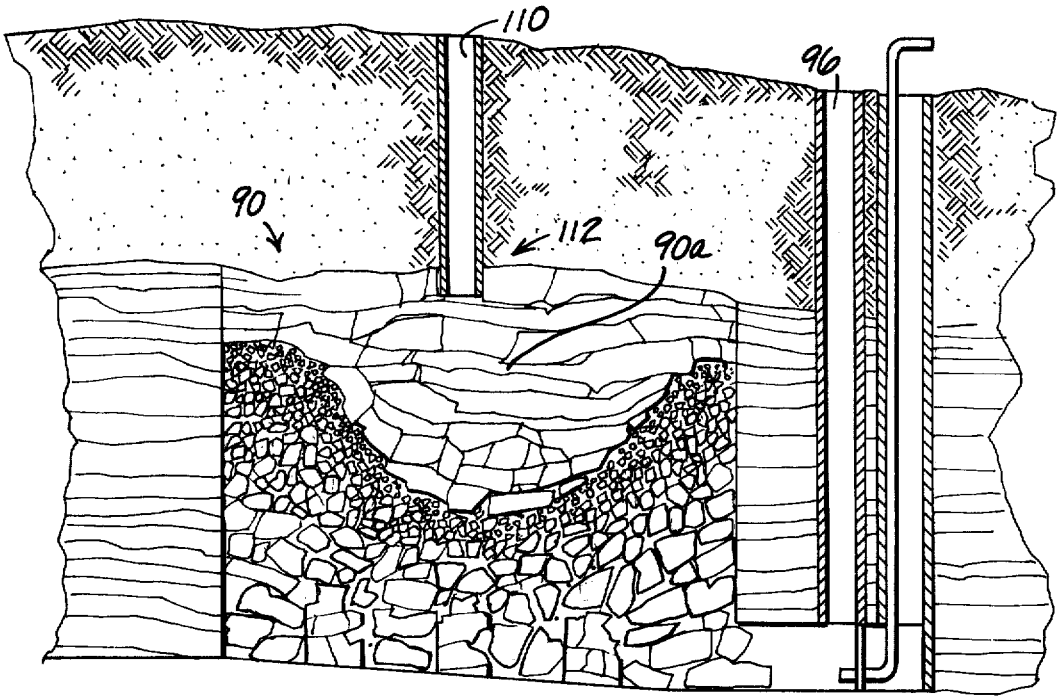
FIG. 9.
FIG. 10.
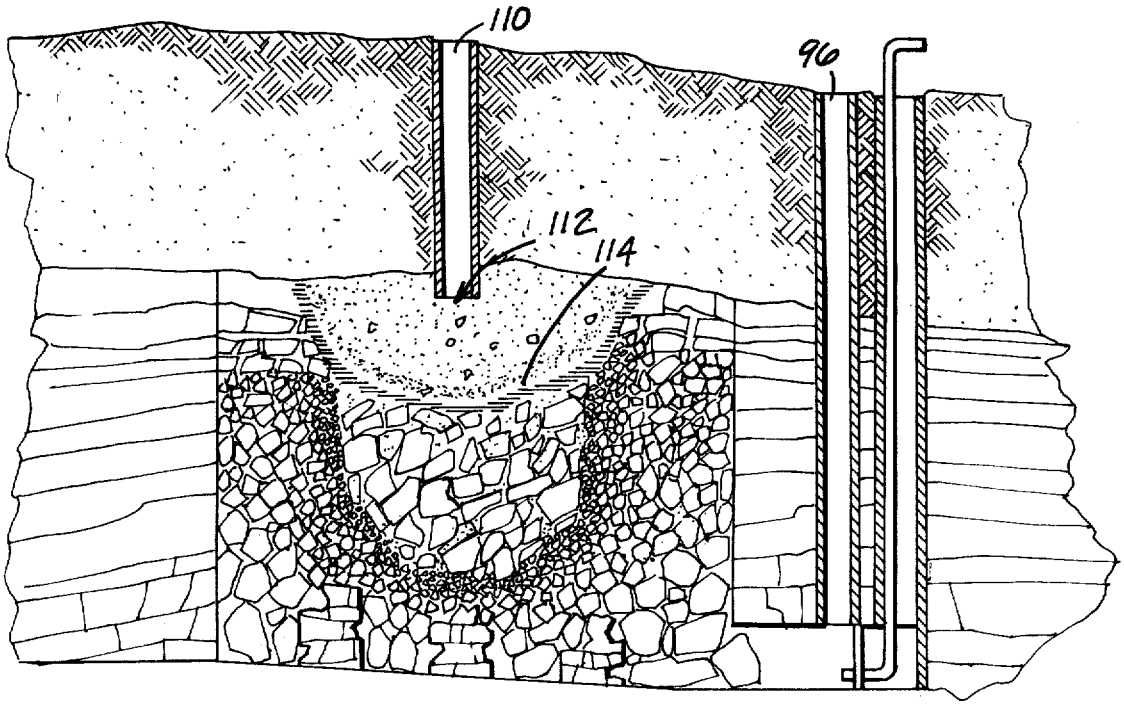

PROCESS FOR RECOVERY OF CARBONACEOUS MATERIALS FROM SUBTERRANEAN DEPOSITS

Matter enclosed in heavy brackets [ ] appears in the original patent but forms no part of this reissue specification; matter printed in italics indicates the additions made by reissue.

*This is a continuation of application Ser. No. 939,420, (abandoned) filed Sept. 5, 1978 for the Re-Issue of Pat. No. 3,980,339 granted Sept. 14, 1976 based on application Ser. No. 568,900 filed Apr. 17, 1975.*

BACKGROUND OF THE INVENTION

The present invention relates to in situ extraction of minerals from subterranean deposits and pertains particularly to a method for extracting carbonaceous values from oil shale and other carbonaceous deposits.

It is well known that enormous deposits of subterranean carbonaceous deposits exist throughout the world today. Such deposits exist in the form of coal, oil shale, and tar sands, for example.

Commercial development of oil shale has lagged in this country because it could not compete with other sources of petroleum. Several proposals for the recovery of carbonaceous values have been made in the past. These proposals have one or more drawbacks which prevent them from being economically feasible.

In situ retorting is one proposal that continues to be of interest today. Several approaches to in situ retorting have been proposed. These approaches are generally exemplified by the following U.S. patents and the prior art cited therein: U.S. Pat. Nos. 1,913,395 issued June 13, 1933; 1,919,636 issued July 25, 1933; 2,481,051 issued Sept. 6, 1949; and 3,661,423 issued May 9, 1972.

These approaches involve breaking up the subterranean formation into rubble, and retorting the rubble. The rubble must be sufficiently packed so that combustion can be initiated in the deposit to drive the fluidized carbonaceous materials from the rubble. On the other hand, the rubble must have sufficient prosity or permeability to enable the fluids driven from the particles to flow therethrough for recovery.

SUMMARY AND OBJECTS OF THE INVENTION

It is the primary object of the present invention to provide a method of preparing a mineral formation for optimum in-situ recovery of carbonaceous values therefrom.

Another object of the present invention is to prepare a mineral formation to have adequate surfaces and sufficient interconnected flow channels that a combustion, oxidation or solution process, once started, can be sustained in an in-situ processed resource where air or a solvent is injected under low pressure differential.

A further object is provide a method of preparation of a permeable bed with a low surface area to minimize wetting by fluids and clinging by viscous liquids ahead of the process front.

Still another object is to provide a system of large interconnected voids or flow channels in a mineral formation to facilitate the flow of heavy viscous fluids therethrough.

In accordance with the primary object of the present invention a gradient of permeability is established between the process starting point and the recovery point in a subterranean mineral formation so that a process can be readily initiated, easily sustained, and mobile, as well as relatively immobile, fluids may be easily and thoroughly recovered.

BRIEF DESCRIPTION OF THE DRAWINGS

The above and other objects and advantages will become apparent from the following description when read in conjunction with the accompanying drawings wherein:

FIG. 1 is an elevational view in section of a formation partially prepared in accordance with the invention for processing by a horizontal movement of the retorting front;

FIG. 2 is a plan view in section of the formation of FIG. 1;

FIG. 3 is a view like FIG. 2 wherein the formation has been prepared for recovery;

FIG. 4 is a view like FIG. 3 showing the progression of a processing front across the prepared formation;

FIG. 5 is a plan sectional view of an alternate arrangement;

FIG. 6 is a sectional view taken generally along lines VI—VI of FIG. 5;

FIG. 7 is an elevational view in section of another embodiment of the invention where the formation is prepared for processing by a vertical movement of the retorting front;

FIG. 8 is a sectional view of the embodiment of FIG. 7;

FIG. 9 is a view like FIG. 7 wherein the formation has been prepared for extraction; and FIG. 10 is a view like FIG. 9 showing a process front moving through the prepared formation.

DETAILED DESCRIPTION OF PREFERRED EMBODIMENTS

Referring now to the drawings, particularly to FIG. 1, there is illustrated a cross-sectional view of an earth formation having a deposit of suitable mineral ore designated generally by the numeral 10, which is a subterranean deposit from which it is desired to extract valuable minerals or the like. The earth formation includes a typical overburden formation, generally designated by the numeral 12 and a base 14 of a material such as siltstone, sandstone, shale, or low-grade oil shale, or other barren rock. The present embodiment is most readily adapted to a generally horizontally aligned formation having a thickness of from 20 feet to 500 feet where the formation is more or less horizontally reposed.

A deposit of generally known characteristics will be selected for the in-situ process in accordance with the present invention. For example, the thickness, general extent of the deposit and its general mineral contents will be known or established prior to selection such as by prior coring and the like.

After the deposit has been selected from which a suitable geometric portion may be delineated, an entry, such as an adit or a mining shaft 16 is sunk from the earth's surface 18 down to at least the base of the deposit 10 and preferably partially into the base 14.

The preselected portion of the deposit 10 is undercut in a suitable manner such as by mining to create a void at the base thereof. The material removed from the undercut 20 is removed by way of shaft 16 to the surface and may be disposed of, or suitably processed to remove any recoverable materials therefrom. It should be noted that the material removed may be either from the mineral body itself or from the base material. In the case of the horizontal process, the undercut or void 20 is preferably cut to have a generally wedge-shaped cross section, as illustrated in FIG. 1, with a sloping floor 22 which may be cut at least partially into the base 14 and a ceiling 24, which may run generally horizontal, formed of or into the base of the deposit 10. The undercut or void 20 should remove anywhere from 0.5% to up to 25% of the overlying deposit and be such as to leave a plurality of pillars supporting the overlying deposit.

The floor 22 of void 20 preferably slopes downward from one end of the selected deposit, designated the inlet, indicated by the numeral 26 and to the end generally referred to as the outlet designated by the numeral 28. Although a slope to the floor is not essential to the process, it will aid in the transport of viscous liquids to the outlet.

As best seen in FIG. 2, the undercut extends throughout the lateral dimensions of the selected deposit and thereby delineates the dimensions of the selected deposit for initial processing. Preferably the deposit selected will have a thickness of anywhere from 20 to 500 feet. The width will be from ½ to two times the height, and the length from two to ten times the width. The minimum length will be preferably two and one-half times the height. In a typical case where the thickness of the formation is approximately 200 feet, the void created should have a height of approximately 15 feet at the inlet or source end and gradually extend up to a height of approximately 40 feet at the outlet.

This shape of the void and, as best seen in FIG. 2, the shape and/or cross-sectional area of the pillars supporting the overburden is such that the volume of the undercut expands from a minimum at the source end 26 to a maximum at the outlet end 28. This expansion in volume is achieved both by the configuration of the undercut, as seen in cross section in FIG. 1, as well as the shape and cross-sectional area of the pillars supporting the overlying deposit. These columns or pillars are preferably composed of the portions of the shale or ore deposit left in place upon the excavation of the material to form the void 20. These columns or pillars may take any suitable form but are preferably formed to vary at least on the order of the cross-sectional areas as shown in FIG. 2. As shown in FIGS. 1 and 2, a series of columns or pillars 30–38 of varying cross-sectional area are left standing upon the excavation of the void 20. This will provide a progressively larger undercut volume progressing from the inlet to the outlet.

The process in accordance with the present invention includes the further steps of removal of these pillars which support the overburden, and the breaking up of the overburden portion of the deposit into rubble in a controlled manner. These steps may be carried out simultaneously with the reoval of the pillars initiating the breaking process. The process of breaking up the body of the deposit into rubble is carried out in a manner to form a gradation of the rubble from a very fine or small particles of rubble beginning at the inlet end of the formation or deposit to an enlarged or coarse rubble of the formation at the outlet. This finer material provides for an easier starting of the retorting process at the inlet side of the deposit and the coarser material will have larger spaces therebetween to provide flow channels for an easier flow of the material extracted to the outlet end of the formation for collection and removal therefrom. Preferably the rubble formed at the inlet end of the deposit will be on the order of approximately 6 inches in diameter and progressively increase up to a diameter of approximately 36 inches for the rubble at the outlet end of the formation.

This gradation of the rubble will result in a similar gradation of void spaces between the particles of rubble. These voids will be, for the most part, in open communication to form flow channels having increasing cross sections toward the outlet, thereby reducing the resistance of flow of a fluid therethrough. This decreasing resistance to flow increases the mobility or transportability of fluids therethrough and is termed herein gradient of permeability for lack of a better term.

The present process of gradation of the rubble also produces a gradation in the clingability of the material for viscous liquids flowing therethrough. The clingability decreases in moving from the area of the inlet to the area of the outlet. This decrease in clingability results from a reduction in the overall surface area of particles in the path of flow. This enhances the mobility or transportability of the fluids through the rubblized formation.

The process of forming the rubble in the desired sizes of particles may be carried out in any suitable manner such as by the use of explosives so that the size of the rubble may be determined by the spacing of the holes in which the explosives are placed and/or the kind of explosives used. Thus, for example, in pillar 30 a plurality of holes for receiving explosives are formed in the pillar at the desired spacing and designated by the numeral 40. These holes are charged with the appropriate kind and size of explosive charges to obtain the desired particle size. A pluraity of explosive charge holes 42 are formed in the pillar 32 at a space slightly larger than that of the spacing of the holes in the previous pillar. This forms progressively larger pieces of rubble as the spacing of charge holes increases. Explosive charge holes 44 are yet further apart and formed in the pillar 34. Similarly, explosive charge holes 46 in pillar 36 are spaced further apart than the preceding holes in the preceding pillar and explosive charge holes 48 in pillar 38 are again spaced further apart than those in pillar 36. It if becomes necessary to do so, a similar plurality of explosive charge holes 50 may be formed in the ceiling 24 of the underside of the deposit 10 for further breaking up the deposit. These holes are similarly more closely spaced at the left or inlet end of the deposit and are spaced progressively further apart as they move towards the outlet end of the deposit.

Upon the detonation of the charges placed in the holes in the various pillars 30–38 for supporting the overlying deposit, the pillars themselves will be broken up into particles of progressively larger size as described above, and similarly the overlying deposit will be broken up in a similar manner to provide rubble that is graded from a finer grade at the inlet end of the selected deposit to a larger size rubble at the outlet size of the deposit. Thus the placement of the explosives, the type of the explosives and the sequence of setting off of the charges of the explosives may be used to pre-size the rubble in the above-described fashion. It is understood, of course, that the rubble itself will not be precisely graded as described, but will have a statistical distribution such that the maximum number of particles in the particular section of the formation will have the preferred preselected sizing. Thus the overall formation when reduced to the rubble will have the gradation as desired, and preferably as that shown in FIG. 3.

As illustrated in FIG. 3, the particles of the deposit are broken up so as to have a finer texture at the inlet end of the retort to a coarser texture at the outlet end. This provides an increasing permeability or transportability of fluids through the deposit from the inlet or process initiation area to the outlet area of the deposit. It will be appreciated that such is the case since the smaller particles will have smaller voids or spaces between them, whereas the larger particles will also have larger voids or spaces between them. This gradient of permeability will provide the advantage of easier initiation of the in-situ retorting process at the inlet end of the deposit and easier flow of the fluids from the outlet end.

The formation, when broken up as in FIG. 3, will preferably have the substantially wedge-shaped configuration as shown by virtue of the increasing void space created by the specific configuration of the undercut.

Turning back to FIG. 1 for a moment, suitable explosive charge holes 50 may be provided at the inlet or process end of the deposit so as to break up that end of the deposit and provide communication with suitable inlet means such as a bore or shaft 54 communicating from the surface 18 down to the end 26 of the deposit.

Turning now to FIG. 3, after the formation is prepared as shown, the inlet communicating means 54 is provided and a suitable source of gas for initiating and controlling the combustion process is introduced into the inlet or low-permeability end of the deposit. The formation is further prepared for the recovery process by providing suitable outlet means such as a shaft at 56 at the outlet end of the deposit through which to recover the products. A plurality of outlets may be provided such as, in the example of oil shale, a gas recovery outlet 56 and a liquid recovery outlet.

A suitable recovery pipe for the recovery of liquids could also be run through the same shaft 56 or alternately, as illustrated, could be run through the shaft 16 and comprise a conduit 62 having the lower end communicating at the outlet end of the deposit at the lower end thereof substantially at the lowermost portion of the floor 22 and sealed by means of a suitable wall or partition 64. The conduit would then extend to the surface 18 and to, for example, a pump 66 for pumping the liquid into a suitable reservoir 68.

In the example for oil shale, the inlet would include, for example, suitable means for supplying air such as by means of a pump or blower 70, which supplies suitable air or other gas mixture under pressure by way of conduit 72 extending downward through the shaft 54 to communicate at the inlet and low-permeability end of the deposit.

After the formation has been prepared as shown in FIG. 3, the retorting process may be begun by applying or providing a source of heat and positive pressure at the inlet end 26 of the prepared deposit. In a typical example for an oil shale, a source of heat and positive pressure, normally a combustion initiated and sustained with air, is commenced at the process source and driven towards the outlet. The heat from the combustion of the carbon residues left in the shale furnishes energy to vaporize and fluidize the carbonaceous values of the deposit and drive them along a front as shown in FIG. 4 to the outlet end of the deposit. Because of the density and low permeability at the inlet end of the formation, the combustion may be readily started at that point and will be supplied by air from the source 70 and move along a front which will extend upward into the caved overlying oil shale formation as shown in FIG. 4 and progress along a front 74 toward the outlet 28.

The carbonaceous values liberated by the heat generated by the combustion are most mobile when present as gases, vapors or mist and will readily progress through the voids or flow channels in the rubble to the outlet where it may be collected such as through outlet 56. Some of the vapors may be condensed by the cooler formation at the outlet end of the deposit and must be removed by means of the liquid-removal portion of the system, such as conduit 62 and pump 66. The heat generated by the combustion and the exhaust gases drive the less mobile liquids to the outlet or, in the alternative, cause them to revaporize and become more mobile and move more rapidly to the outlet. The highly viscous fluids driven from the deposit will progress ahead of the combustion front 74 through the voids between the rubble to be collected and removed at the outlet.

Other mineral deposits other than oil shale, such as metallic ores, may be prepared in accordance with the present process and a suitable extraction process, such as leaching, applied thereto. For example, a mineral deposit such as a copper-bearing sulfide may be processed in this manner by moving a dissolving agent through the rubblized ore for reaction with and solution of the copper minerals. The product fluid must be capable of transporting the desired mineral values as well as the entrained solids, colloids and gels. With the greater pore size and less pore surface area in the system as the process outlet is approached, the tendency to plug is reduced. Plugging is caused by solids filtering out, or ion exchange reactions permitting plating out of valuable materials or colloids and gels before the outlet is reached. By use of the gradient of permeability established by this process, the mineral-laden liquid progresses easily through the broken material, and into the outlet for recovery from the system.

Turning now to FIGS. 5 and 6, a cluster of adjacent retorts are processed simultaneously. In accordance with this aspect of the invention or process, a plurality of adjacent sections of the ore body are selected and undercut and prepared as in the previously discussed process. For example, as can be seen in FIGS. 5 and 6, portions 76 and 78 of the ore body are selected adjacent one another and undercut and prepared as described above. This undercutting preparation is in such a manner as to leave a membrane partition 80 between the adjacently prepared portions of the deposit. Separate inlets 82 and 84 are provided for the separate selected portions of the body as well as separate outlets 86 and 88. In this cluster arrangement, ideally the membrane or pillars partition is also processed or retorted as the respective fronts progress down each of the respective portions of the deposit. These partition pillars 80 may also be involved in the processing by at least partially removing such as by explosively removing said partition pillars for inclusion into the process or processing. Thus, this cluster concept permits the greater recovery of the values from the shale, as well as greater economies because of the possibility of simultaneous use of common equipment and men for the multiple-unit processing.

Turning now to FIGS. 7-10, there is illustrated a generally vertical processing technique which is ideally suited for where the deposit is substantially vertically inclined or of substantial vertical thickness. As best seen in FIGS. 7 and 8, a predetermined portion of a subterranean deposit is blocked out or delineated and prepared in a manner somewhat similar to that previously discussed wherein the permeability of the broken deposit material progresses in permeability from very little at the uppermost portion of the selected portion to a greater permeability at the lower section thereof. As best seen in FIG. 7, a suitable mineral deposit 90 is selected having the usual overburden 92 and the usual base 94. In this instance the base may also be a continuation of the shale or mineral deposit 90. A suitable mining shaft 96 is sunk to the selected base of the deposit 90 and may also define an outlet 98 for the selected portion of the deposit. A suitable undercut is accomplished to prepare or form a void 100 at the base of the deposit 90. The void may be formed to have a sloping floor 102 which slopes toward the outlet 98, and a ceiling 104 which may either slope or be horizontal as preferred. After the undercut 100 is formed, leaving suitable supporting pillars 106 for supporting the overlying deposit 90, suitable blast holes 108 are formed in the overlying deposit 90 and the pillars 106 if desired. The blast holes are drilled and high explosives emplaced therein, which upon detonation initiate collapse and caving of the overlying deposit to distribute the permeable void upwards to the top of the deposit. The gradients of permeability are distributed such that the center of the delineated block of the deposit is less permeable than the margin or outer area and the lower outlet zone is more permeable than the upper limits of the caved deposit. Where the undercut is insufficient, by volume, for the desired percent of porosity, additional volume is to be extracted from the collapsed and caved material at the undercut level by any one of several block-caving methods. The material extracted by block-caving and from the undercut level being proportional such that the distribution of permeable void conforms to the desired geometry for the in-situ process, whether for combustion in oil shale extraction, or be leaching or an oxide or sulfide copper deposit.

In this embodiment a suitable inlet is defined by a shaft 110 extending from the upper surface of the overburden 92 down to the upper surface of the deposit 90. This defines an inlet at 112 for the introduction of suitable combustible or processing materials to initiate and sustain a suitable process for the recovery of the materials from the deposits. When the deposit material is broken up, as seen in FIG. 9, a central less broken portion 90a may be left between the inlet 112 and the surrounding broken-up portion of the formation.

Ideally the zone of the permeability will extend all the way from the inlet at 112 to the outlet 98. However, as illustrated in FIGS. 9 and 10 an unbroken portion 90a may be left as a result of the difficulty in completely controlling the breaking up of the selected portion of the formation all the way to the inlet. This results in the controlled gradation of rubble size extending from a point at least halfway to the inlet from the outlet and extending to the outlet.

When a combustion process is initiated in this formation at the inlet 112, the combustion front will progress as indicated at 114 outward from the inlet, driving the gases and liquids from the deposit outward into the broken-up, more permeable portion of the formation and permit it to flow among the voids or flow channels in the rubble to the outlet, where it is recovered. The processing of the material continues from the dense or less permeable portion of the formation to the more permeable part thereof.

From the above discussion or description it is seen that we have provided an improved process for the recovery of materials from subterranean deposits. In accordance with the process, a predetermined portion of a desired subterranean deposit is selected and its confines delineated by undercutting to create a void into which the overlying deposit is broken. An inlet and an outlet for the deposit is provided and the deposit broken up in a manner to provide a gradation of fine materials at the inlet to coarse materials at the outlet to provide a progressively more permeable formation from the inlet to the outlet. *In other words, the deposit is broken-up, such that the permeable zone between the inlet and outlet is characterized by continuously increasing in permeability with increasing distance from the inlet to the outlet.* A process of recovery is initiated at the inlet and recovered materials driven through the permeable portion of the formation to the outlet and thereat recovered.

While the present invention has been described with respect to specific embodiments, it is to be understood that numerous changes and modifications may be made therein without departing from the spirit and scope of the invention as defined in the appended claims.

What is claimed is:

1. A process for the in-situ recovery of carbonaceous values from subterranean deposits which comprises the steps of:

selecting a portion of said carbonaceous deposit as an in-situ retort by establishing confining barriers within which the process is to occur;

establishing communication with the base of the subterranean deposit;

undercutting at least at the base of said deposit to remove from 0.5 percent to 25 percent by volume of said deposit thereby leaving an overlying deposit supported by pillars and a void into which said overlying deposit can be broken;

providing said void with a source inlet and an outlet spaced from said inlet, and said void being shaped to have minimum space at said inlet and expanding to a maximum at said outlet;

removing said pillars for thereby initiating the breaking of said overlying carbonaceous deposit to provide a rubblized particulate mass having a void volume approximately equal to the volume of said undercut;

said breaking being carried out in a manner to provide a gradation of rubble size from a minimum size at said inlet to a maximum size at said outlet;

providing conduit means for communicating reacting fluids for initiating and controlling a combustion process within said rubble;

initiating a combustion process near the inlet and controlling said combustion for driving carbonaceous values to said outlet; and withdrawing said carbonaceous values from said deposit at said outlet.

2. The process of claim 1 wherein said undercutting is substantially wedge-shaped in cross section having its minimum thickness at the inlet and its maximum thickness at the outlet end.

3. The process of claim 1 wherein the floor of said undercut is sloped toward said outlet.

4. The process of claim 1 wherein said formation is explosively broken.

5. The process of claim 4 wherein the placement of explosives within said formation is such as to create progressively larger particles from inlet to outlet.

6. The process of claim 5 wherein said step of undercutting is carried out so that said pillars are shaped from portions of said deposit left in place to support the overlying deposit.

7. The process of claim 1 comprising the steps of:

forming a cluster of adjacent retorts separated by thin wall partition pillars; and processing said cluster of adjacent retorts simultaneously.

8. The process of claim 7 comprising the step of:

partially removing said partition pillars for inclusion into said processing.

9. The process of claim 7 comprising the step of explosively removing said partition pillars for inclusion into said process.

10. The process of claim 1 wherein said step of selecting a deposit comprises:

selecting said deposit from the group consisting of oil shale, oil tars, oil sands, tar sands, gilsonite, black shales, lignite, and coal.

11. The process of claim 1, wherein said source inlet is located substantially on the level with said outlet and spaced therefrom so that substantially said entire deposit selected for processing lies between said inlet and said outlet.

12. A method of preparing a subterranean mineral deposit for in-situ extraction of mineral values therefrom comprising the steps of:

selecting a portion of said deposit for processing;

providing an outlet in communication with an area defining a base of said selected portion of said deposit;

providing an inlet communicating with said selected portion at a point spaced from said outlet so that said portion lies substantially between said inlet and said outlet;

breaking said portion of said deposit into rubble defining a permeable zone extending between said inlet and said outlet and *continuously* increasing in permeability *with increasing distance* from said inlet to said outlet so that the process of extraction may be initiated at the inlet and the extracted minerals transported through high permeability area to the outlet.

13. The method of claim 12 including the steps of undercutting said portion of said deposit to thereby define said base; and explosively breaking overlying portions of said deposit into said undercut by predetermined placement of explosives thereby forming rubble having a gradation of size to provide increasingly larger interconnected voids from said inlet to said outlet to define said increasing permeability.

14. The method of claim 13 including the step of sloping the floor of said undercut toward said outlet.

15. The method of claim 13 including providing communicating means for initiating a process of extraction of minerals from said broken portion of said formation at the area of low permeability thereof.

16. The method of claim 15 comprising orienting said zone of permeability horizontally so that a process of extraction can be carried out horizontally from said inlet to said outlet.

17. The method of claim 16 wherein the step of undercutting includes the step of shaping said undercut to have an increasing volume of space progressing from said inlet to said outlet.

18. The method of claim 16 wherein the step of undercutting includes removing from 0.5% to 25% of the overlying selected portion of said deposit.

19. The method of claim 18 wherein said mineral deposit is selected to have a thickness of between 20 and 500 feet; and the step of selecting said portion includes selecting a portion having a width of from ½ to 2 times the thickness and a minimum length of 2½ times the height.

20. The method of claim 19 comprising selecting said length of said portion to be from 2 to 10 times the width.

21. The method of claim 19 comprising the steps of initiating an extraction process in the area of the communication of said inlet with said selected portion of said formation.

22. The process of claim 21 wherein said step of selecting said deposit comprises:

selecting said deposit from the group consisting of oil shale, oil tars, oil sands, tar sands, gilsonite, black shales, lignite, and coal.

23. The process of claim 22 comprising the steps of:

forming a cluster of adjacent retorts separated by thin wall partition pillars; and processing said cluster of adjacent retorts simultaneously.

24. The process of claim 23 comprising the step of:

partially removing said partition pillars for inclusion into said processing.

25. The process of claim 24 comprising the step of explosively removing said partition pillars for inclusion into said process.

26. A process for the in-situ recovery of carbonaceous values from subterranean deposits which comprises the steps of:

selecting a portion of said carbonaceous deposit as an in-situ retort by establishing confining barriers within which the process is to occur;

establishiing communication with the base of the subterranean deposit;

undercutting at least at the base of said deposit to remove from 0.5 percent to 25 percent by volume of said deposit thereby leaving an overlying deposit supported by pillars and a void into which said overlying deposit can be broken;

providing said void with a source inlet and an outlet spaced from said inlet, and said void being shaped to have minimum space at said inlet and expanding to a maximum at said outlet;

breaking said overlying carbonaceous deposit to provide a rubblized particulate mass having a void volume approximately equal to the volume of said undercut;

said breaking being carried out in a manner to provide a gradation of rubber size from a minimum size at a point at least halfway to said inlet from said outlet to a maximum size at said outlet;

providing conduit means for communicating reacting fluids for initiating and controlling a combustion process within said rubble;

initiating a combustion process near the inlet and controlling said combustion for driving carbonaceous values to said outlet; and withdrawing said carbonaceous values from said deposit as said outlet.

27. The process of claim 26 wherein said source inlet is established at the top of said retort and said combustion process is initiated at said top at said inlet so that said process progresses downward to said outlet.

28. A method of preparing a subterranean mineral deposit for in-situ extraction of mineral values therefrom comprising the steps of:

selecting a portion of said deposit for processing;

providing an outlet in communication with an area defining a base of said selected portion of said deposit;

providing an inlet communicating with said selected portion at a point spaced from said outlet so that said portion lies substantially between said inlet and said outlet;

breaking said portion of said deposit into rubble defining a zone of permeability extending between a point of at least halfway to said inlet from said outlet and *continuously* increasing in permeability *with increasing distance* from said point to said outlet so that the process of extraction may be initiated at the inlet and the extracted minerals transported through high permeability area to the outlet.

29. The method of claim 28 including the steps of undercutting said portion of said deposit to thereby define said base; and explosively breaking overlying portions of said deposit into said undercut by predetermined placement of explosives thereby forming rubble having a gradation of size to provide increasingly larger interconnected voids from said point to said oulet to define said increasing permeability.

30. The method of claim 29 comprising orienting said zone of permeability vertically so that a process of extraction can be carried out vertically from said inlet to said outlet.

* * * * *